Figure 1:
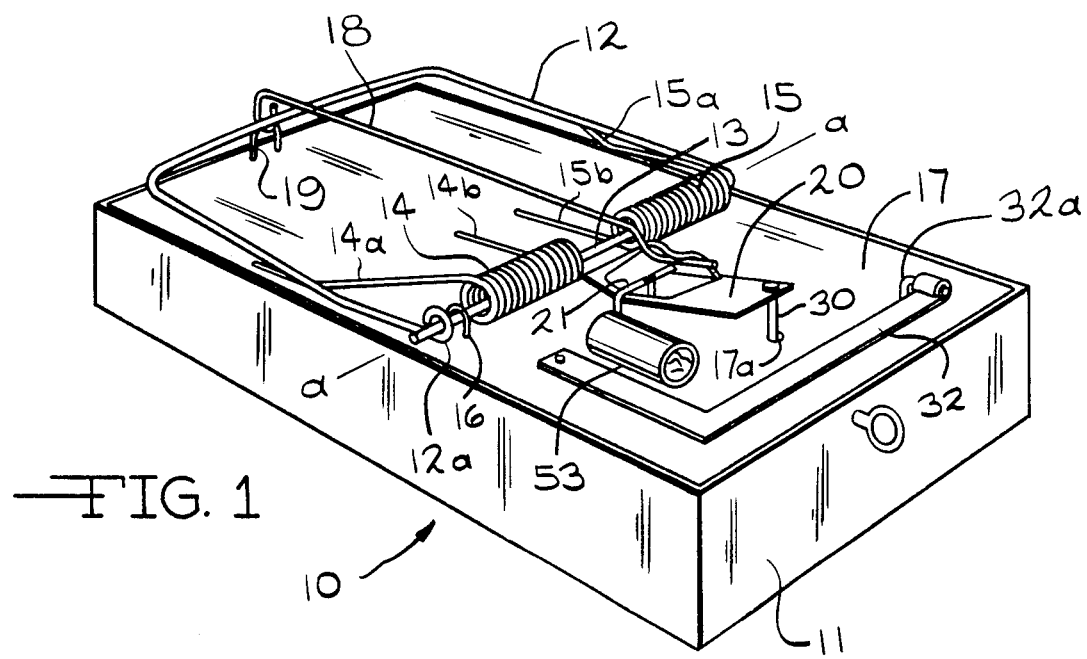

United States Patent [19]

Kon

[11] Patent Number: 4,719,718

[45] Date of Patent: Jan. 19, 1988

[54] ELECTRICALLY OPERATED ANIMAL TRAP

[76] Inventor: Robert T. Kon, 83 W. Sherwood, Williamston, Mich. 48895

[21] Appl. No.: 52,279

[22] Filed: May 21, 1987

[51] Int. Cl.$^4$ ........................................... A01M 23/30
[52] U.S. Cl. ........................................................ 43/81
[58] Field of Search ........................................... 43/81

[56] References Cited

U.S. PATENT DOCUMENTS

| | | | |
|---|---|---|---|
| 869,594 | 10/1907 | Stone | 43/81 |
| 2,199,167 | 4/1940 | Brooks | 43/75 |
| 2,599,541 | 6/1952 | Burns | 43/75 |
| 4,403,438 | 9/1983 | West-Harron | 43/81 |
| 4,483,094 | 11/1984 | McKee | 43/81 |
| 4,550,524 | 11/1985 | Goebel | 43/75 |

Primary Examiner—Gene P. Crosby
Attorney, Agent, or Firm—Ian C. McLeod

[57] ABSTRACT

A trap assembly (10) and housing (11) providing an electrical circuit (FIG. 5) for triggering the trap assembly is described. A coil (31) pulls a plunger (30) to activate a lever (20) to release a rod 18 holding the U-shaped wire 12. The wire and rod are part of the electrical series circuit so that the circuit is disconnected after the trap is sprung. The animal A and base 17 can be discarded from the housing, battery B and coil which can be reused.

22 Claims, 5 Drawing Figures

ELECTRICALLY OPERATED ANIMAL TRAP

BACKGROUND OF THE INVENTION (1) Summary of the Invention

The present invention relates to an animal trap of the type wherein a trapping means rotates from a cocked to an uncocked position when triggered and which uses an electrically operated solenoid to trigger the trapping means. In particular, the present invention relates to an animal trap wherein power is used for springing the trap and then disconnected to prevent a drain on the power source.

(2) Prior Art

U.S. Pat. Nos. 869,594 to Stone and 4,403,438 to West-Harron are illustrative of traps wherein a U-shaped wire trapping means pivots on a horizontal axis of the trap from a cocked to an uncocked position when mechanically triggered. The trap is inexpensive; however, the problem is that these traps require a significant mechanical effort to trigger the trap.

U.S. Pat. Nos. 2,199,167 to Brooks, 2,599,541 to Burns, 4,483,094 to McKee and 4,550,524 to Goebel describe very complicated traps which are electrically operated using a solenoid. These traps would be too expensive to manufacture. The devices shown in these references are inherently more hazardous to users than the present invention due to higher voltages required for operation.

OBJECTS

It is therefore an object of the present invention to provide an electrically triggered animal trap with a pivotably mounted trapping means which rotates to trap the animal. Further it is an object of the present invention to provide an electrically triggered animal trap which is simple and inexpensive to construct using readily available materials. These and other objects will become increasingly apparent from the following description and the drawings.

IN THE DRAWINGS

FIG. 1 is a perspective view of a rodent trap assembly 10 and housing 11, particularly illustrating the preferred cocked position of U-shaped wire 12 serving as a trapping means.

Figure 2:
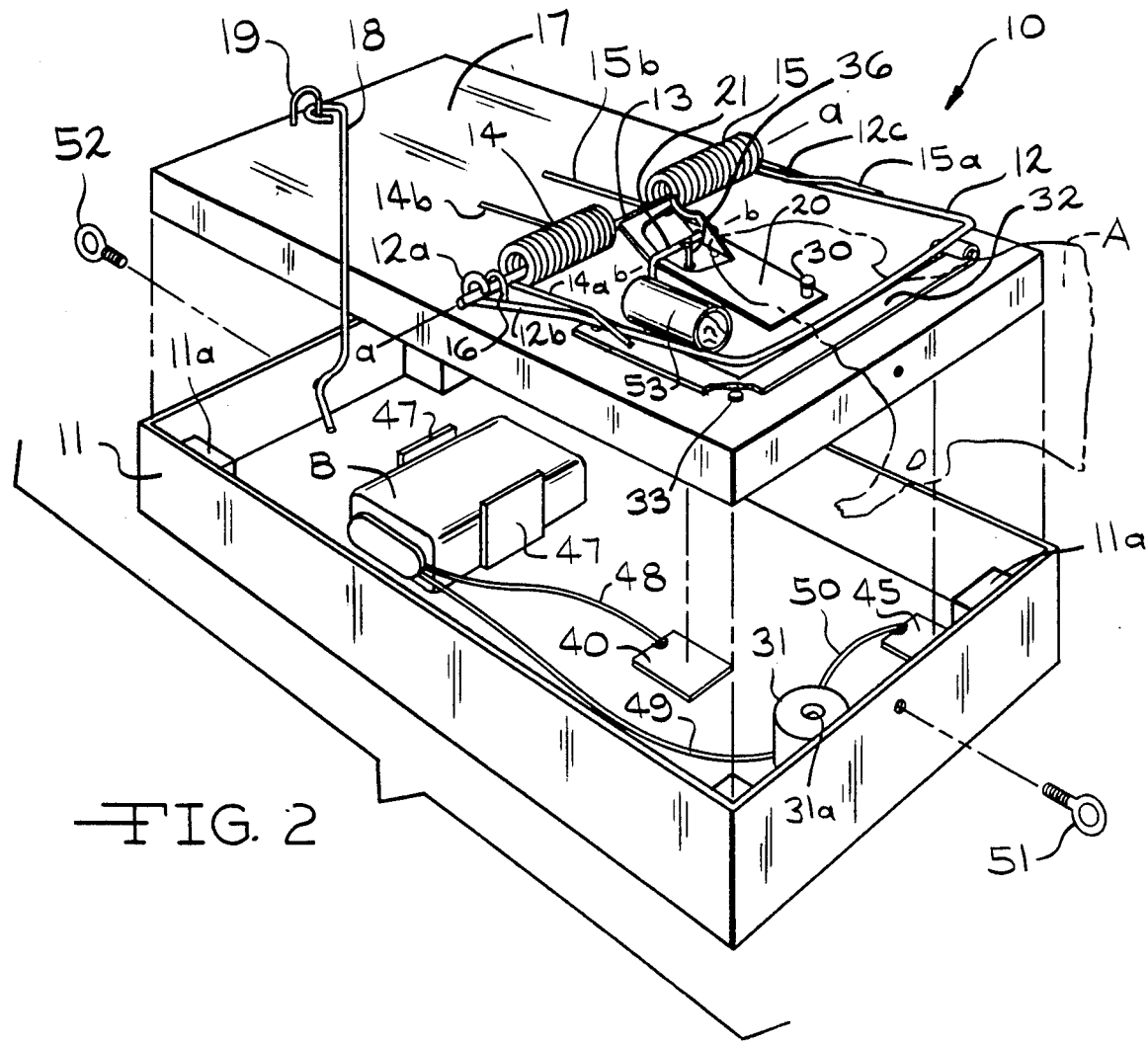

FIG. 2 is a separated perspective view of the rodent trap assembly 10 and housing 11 shown in FIG. 1 particularly illustrating the wire 12 in the uncocked or sprung position with a trapped animal A shown in broken lines.

Figure 3:
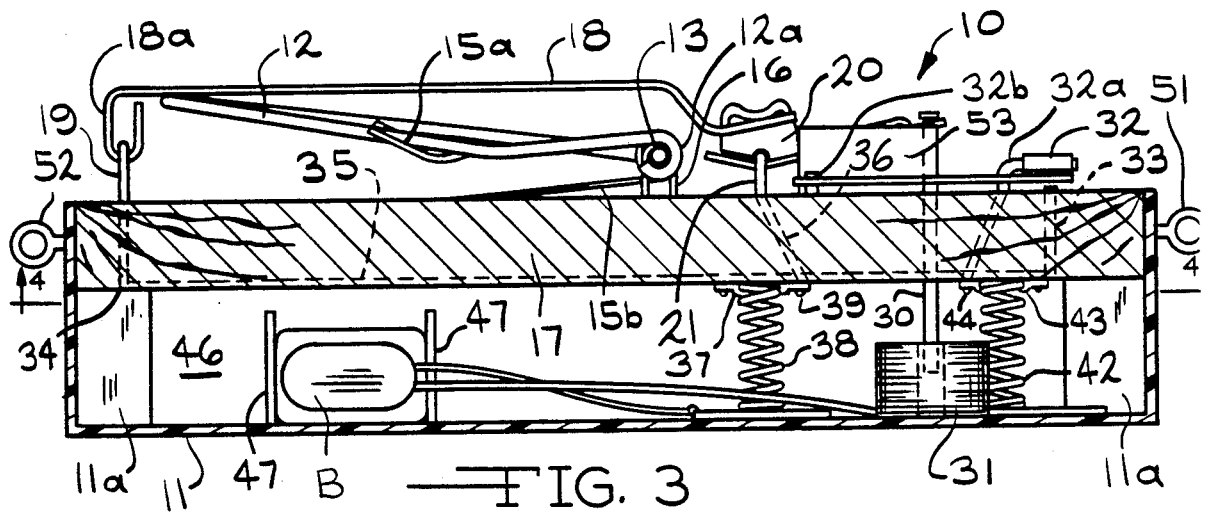

FIG. 3 is a side cross-sectional view of the trap shown in FIG. 1, particularly illustrating the solenoid 31 and plunger 30 for triggering the cocked wire 12 into the uncocked position shown in FIG. 2.

Figure 4:
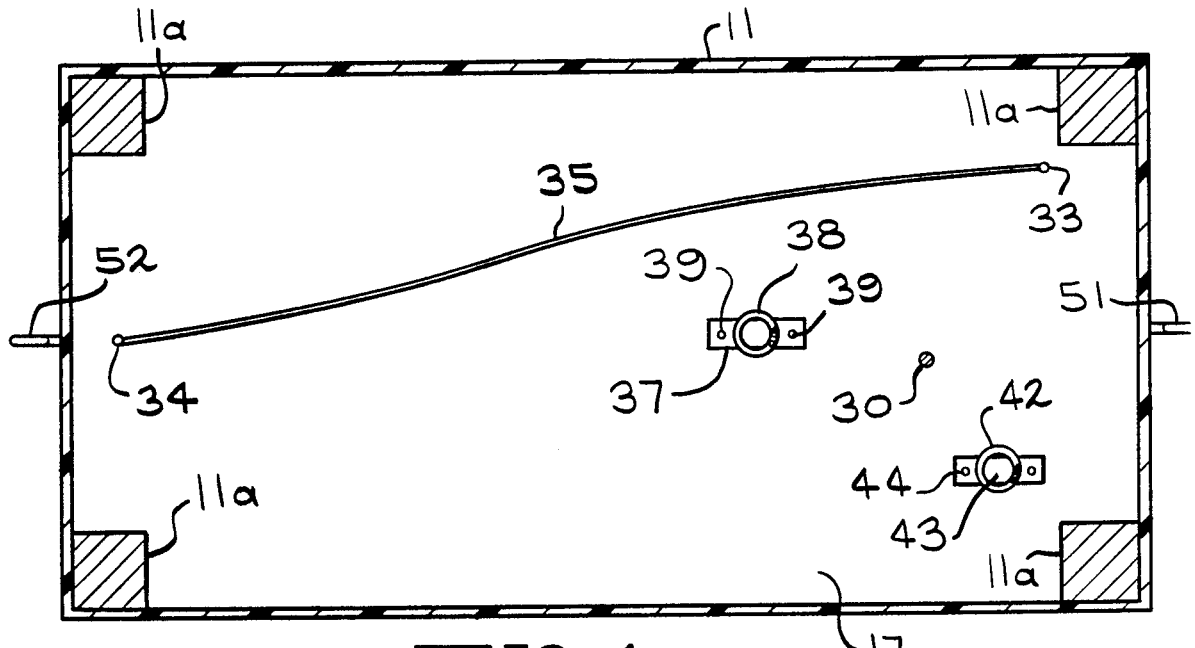

FIG. 4 is a plan cross-sectional view along line 4—4 of FIG. 3, particularly showing the position of springs 38 and 42 which act as electrical connectors between the housing 11 and trap assembly 10.

Figure 5:
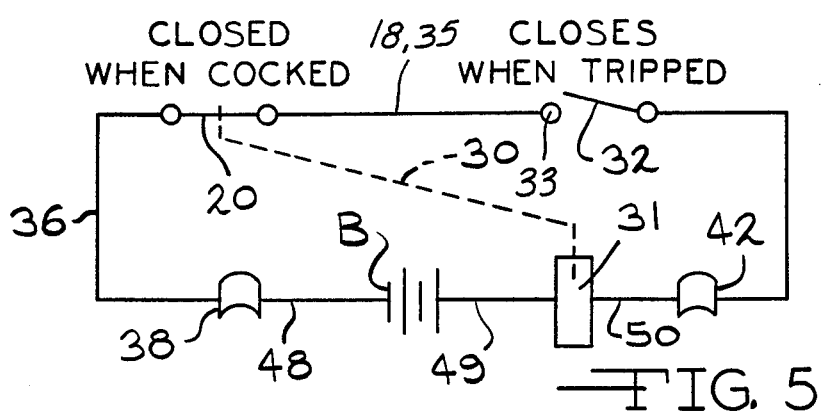

FIG. 5 is a schematic electrical circuit diagram showing the wire 12 in the cocked position ready to be triggered by the solenoid 31.

GENERAL DESCRIPTION

The present invention relates to an animal trap apparatus including a base having one side supporting a rotatable trapping means loaded by a spring means and pivotable about a pivot axis between cocked and uncocked positions, a holding means for holding the trapping means in the cocked position and a trip means which engages the holding means until the trip means is dislodged from the holding means for the trapping means to thereby move the trapping means to the uncocked position so that the animal is trapped on the one side of the base by the trapping means the improvement which comprises: a housing having a bottom and at least one wall surrounding the bottom defining an opening such that the base fits as a cover in closely spaced relationship in the opening to define a chamber; electromechanical means powered by an electrical circuit mounted in the chamber; trip means moveable by the electromechanical means wherein the electromechanical means can dislodge the trip means from the holding means and release the trapping means when powered by the electrical circuit; and electrical switch means mounted on the one side of the base which is engaged by the animal to activate the electrical circuit, electromechanical means and trip means.

The present invention particularly relates to an improved animal trap apparatus including a base having one side supporting a trapping means loaded by a spring means and pivotable about a pivot axis between cocked and uncocked positions, a holding means for holding the trapping means in the cocked position and a trip means which engages the holding means until the trip means is dislodged from the holding means for the trapping means to thereby move the trapping means to the uncocked position so that the animal is trapped on the one side of the base by the trapping means the improvement which comprises: a housing having a bottom and at least one wall surrounding the bottom defining an opening such that the base fits as a cover in closely spaced relationship in the opening to define a chamber; electrical coil means powered by an electrical circuit mounted in the chamber wherein there is a central hole inside the coil means; a moveable plunger means positioned in the hole in the coil means and attached to the trip means wherein the plunger means can be activated by the coil means to dislodge the trip means from the holding means and release the trapping means; and electrical switch means mounted on the base which is engaged by the animal to activate the coil means and plunger means. In particular the present invention relates to the apparatus wherein a securing means is provided to hold the base and the housing together in use.

SPECIFIC DESCRIPTION

FIGS. 1 to 4 show the electrically triggerable rodent trap assembly 10 of the present invention. FIG. 5 shows the series electrical circuit.

A conventional rodent mechanically triggered wooden rodent trap is preferably used in the manufacture of the electrically triggerable trap assembly 10 mounted on a housing 11 on supports or spacers 11a. The trap assembly 10 includes a U-shaped wire 12 as a trapping means which pivots on horizontal axis a—a between a cocked position as shown in FIGS. 1 and 3 and an uncocked position as shown in FIG. 2. A shaft 13 supports the U-shaped wire on eyelets or hooks 12a. Typically the wire 12 and shaft 13 are integral and form a loop. Coil springs 14 and 15 are mounted around the shaft 13 with first arms 14a and 15a engaging proximal ends 12b and 12c, respectively, of the wire 12. Second arms 14b and 15b engage the base 17. Brads 16 secure the shaft 13 to the base 17 which is usually made of wood. A rod 18 is mounted by a hook 18a at the distal end of the wire 12 from the pivot axis a—a by means of a brad 19. The rod 18 is connected to a trip lever 20 is secured for pivoting movement on an axis b—b parallel to axis a—a on brad 21 in the cocked position shown in FIG. 1 and disconnected as shown in FIG. 2. When a conventional spring trap is used a bait (not shown) is provided on the trip lever 20 which the animal trips to release the rod 18 from the lever 20 so that the wire 12 is released to the uncocked position to trap the animal A.

In the present invention the trip lever 20 is connected by means of a plunger 30 provided in a hole 31a in a coil 31 through an opening 17a the base 17. The plunger 30 and coil 31 form a solenoid. A trigger plate 32 is secured to the base 17 by brads 32a and 32b and mounted in spaced (non-conductive) relationship over a conductive pin 33 which extends through the base 17. The pin 33 is connected to brad 19 by means of pin 34 through wire 35. Thus rod 18 and lever 20 are conductive, as are brads 19 and 21. A wire 36 (FIG. 2) leads to strap 37 (FIG. 4) and spring 38. The strap 37 is held in place on base 17 by nails 39. The spring 38 leads to a metal plate 40 secured to housing 11. A spring 42 is secured to base 17 by means of a second strap 43 by nails 44 and leads to a second metal plate 45 secured to housing 11. A battery B is secured by clip 47 in the chamber 46 created by the housing 11 and base 17 and the spacers 11a provided at the corners of the housing 11. A wire 48 leads to the plate 40. Wire 49 leads to the coil 31 and wire 50 leads to the plate 45. Eyelets 51 and 52 secure the base 17 and housing 11 together. A bait receptacle 53 is provided adjacent the trigger plate 32.

As can be seen from FIGS. 1 to 5, when the animal A depresses the trigger plate 32 contact is made with pin 33 which closes the circuit as shown in FIG. 5 and the wire 12 rotates to the position shown in FIG. 2 around axis a—a to trap the animal A. When triggered, the rod 18 is disconnected from lever 20 by means of the plunger 30 being pulled into the hole 31a of coil 31. At the same time the rod 18 is disconnected from the lever 20 so that the circuit (FIG. 5) is broken thus preventing a drain on the battery B. The base 17 of trap assembly 10 can then be thrown away with the animal or re-used. Preferably the trigger plate 32 is coated with a non-conductive material. This prevents the possibility of electrical drainage caused by the body of the animal. It will be appreciated that various trapping means other than wire 12 can be used to trap the animal A, such as a flat plate (not shown). Also various holding means for the rotatable means can be used other than rod 18. The trip means is preferably lever 20; however other trip means can be used to secure the holding means prior to actuation. All of these variations will be obvious to one skilled in the art.

The coil is preferably about ¼" in length with a wound diameter of ca. 0.70–0.75" and a hollow core of ca. ¼". It was wound with 28 gauge winding wire and has a small resistance. It can be fastened to the housing 11 with a glue.

Thus the present invention uses a pressure activated switch to complete an electrical circuit (FIG. 5) which powers an electromagnetic relay (or solenoid) including coil 31 and plunger 30 thereby causing the release of the killing wire 12. Electric power preferably comes from a 9-volt battery B. The improvement includes part of an electronic triggering mechanism, and a trap system which consists of two parts. Part one is the housing 11 which can be reused many times. It is preferably a rectangular box open completely on the top and sized to snugly accept the base 17. The housing 11 holds the battery B, some of the circuitry (FIG. 5), two contact means (plates 40 and 45) and the coil 31. Part two is the modified trap in the top of the housing 17 preferably meets the base flush with the opening in the housing 17. Holes are drilled into the wood of the trap, three of which are for electric wires, pins or wires 33, 34 and 36, for the plunger 30 to sit loosely within the electric coil 31 while engaging the lever 20 of the trap. When all circuits are closed the plunger 30 pulls down on the lever 20 and releases the wire 12. The bait sits on the trap in a way that it is protected by the trigger plate 32. The bait receptacle 53 is closed at the rear and open at the front so the animal must cross the plate 32 to closely investigate the bait. The trap is designed to be disposable or reusable as wished.

Various electromechanical means can be used to operate the trap means such as lever 20. Thus for instance an electromagnet adjacent the lever 20 can magnetically attract and trip the lever 20 without the plunger 30. Other electromechanical means will be apparent to those skilled in the art.

It is intended that the foregoing description be only illustrative of the present invention and that the present invention be limited only by the hereinafter appended claims.

I claim:

1. In an animal trap apparatus including a base having one side supporting a rotatable trapping means loaded by a spring means and pivotable about a pivot axis between cocked and uncocked positions, a holding means for holding the trapping means in the cocked position and a trip means which engages the holding means until the trip means is dislodged from the holding means for the trapping means to thereby move the trapping means to the uncocked position so that the animal is trapped on the one side of the base by the trapping means the improvement which comprises:
    (a) a housing having a bottom and at least one wall surrounding the bottom defining an opening such that the base fits as a cover in closely spaced relationship in the opening to define a chamber;
    (b) electrical coil means powered by an electrical circuit mounted in the chamber wherein there is a central hole inside the coil means;
    (c) a movable plunger means positioned in the hole in the coil means and attached to the trip means wherein the plunger means can be activated by the coil means to dislodge the trip means from the holding means and release the trapping means; and
    (d) electrical switch means mounted on the base which is engaged by the animal to activate the coil means and plunger means.

2. The apparatus of claim 1 wherein the trip means disengages the coil means from the electrical circuit when the trapping means is in the uncocked position.

3. The apparatus of claim 1 wherein the holding means is a rod with a hook shaped portion attached to the base adjacent a distal end of the trapping means from the pivot axis in the cocked position and which extends over the trapping means and the pivot axis to engage the trip means mounted adjacent to the pivot axis to hold the trapping means in the cocked position.

4. The apparatus of claim 3 wherein the rod and trip means are electrically conductive and are connected into the electrical circuit so as to allow activation of the coil in the cocked position and to open the electrical circuit when the trip means is dislodged from the holding means.

5. The apparatus of claim 1 wherein the electrical circuit is powered by a D.C. battery mounted in the chamber on the housing.

6. The apparatus of claim 1 wherein elements of the electrical circuit are completed when the base and housing are mounted together.

7. The apparatus of claim 1 wherein electrical connector means are mounted on the base on a side opposite the one side and on the housing inside the chamber so that elements of the electrical circuit are completed when the base is mounted in the opening in the housing.

8. The apparatus of claim 6 wherein the electrical connectors are conductive coil springs which are compressed into metal plates mounted on the housing inside the chamber.

9. The apparatus of claim 1 wherein the switch means is provided by a plate mounted on the one side of the base adjacent the bait spaced apart from a pin mounted through the base and wherein the plate and pin are compressed together by the animal to actuate the coil means and plunger means.

10. The apparatus of claim 1 wherein a securing means is provided to hold the base and the housing together.

11. The apparatus of claim 1 wherein the trapping means is a U-shaped wire loaded by a coil spring as the spring means mounted on the pivot axis and engaging proximal ends of the U-shaped wire, wherein the holding means is a rod attached by a hook to the base adjacent a distal end of the U-shaped wire from the pivot axis in the cocked position and extends over the U-shaped wire and pivot axis to engage the trip means mounted adjacent the pivot axis and wherein the rod is disengaged from the trip means when the coil means is activated to move the plunger means.

12. The apparatus of claim 11 wherein the rod and trip means are electrically conductive and are connected into the electrical circuit so as to allow activation of the coil means in the cocked position and to disconnect the electrical circuit when the trip means is disconnected from the holding means.

13. The apparatus of claim 12 wherein the electrical circuit can be powered by a D.C. battery provided on mounting means provided in the chamber in the housing.

14. The apparatus of claim 13 wherein elements of the electrical circuit are completed when the base and housing are connected together.

15. The apparatus of claim 13 wherein electrical connection means are mounted on the base on a side opposite the one side so as to be inside the chamber in the housing so that elements of the electrical circuit are completed in the cocked position when the base is mounted in the opening in the housing.

16. The apparatus of claim 15 wherein the electrical connection means are conductive coil springs which are compressed into metal plates mounted on the housing inside the chamber.

17. The apparatus of claim 11 wherein a securing means is provided to hold the base and the housing together.

18. The apparatus of claim 11 wherein the switch means is provided by a plate mounted on the one side of the base adjacent the bait spaced apart from a pin mounted through the base and wherein the plate and pin are compressed together by the animal to activate the coil means and plunger means.

19. The apparatus of claim 18 wherein the rod and trip means are electrically conductive and are connected into the electrical circuit so as to allow activation of the coil means with the U-shaped wire in the cocked position and to disconnect the electrical circuit when the trip means is disconnected from the holding means.

20. The apparatus of claim 19 wherein the electrical circuit can be powered by a D.C. battery provided on mounting means provided in the chamber in the housing.

21. The apparatus of claim 20 wherein a securing means is provided to hold the base and the housing together.

22. In an animal trap apparatus including a base having one side supporting a rotatable trapping means loaded by a spring means and pivotable about a pivot axis between cocked and uncocked positions, a holding means for holding the trapping means in the cocked position and a trip means which engages the holding means until the trip means is dislodged from the holding means for the trapping means to thereby move the trapping means to the uncocked position so that the animal is trapped on the one side of the base by the trapping means the improvement which comprises:
  (a) a housing having a bottom and at least one wall surrounding the bottom defining an opening such that the base fits as a cover in closely spaced relationship in the opening to define a chamber;
  (b) electromechanical means with a coil means having a central hole in which is mounted a moveable plunger means, wherein the coil means is powered by an electrical circuit mounted in the chamber;
  (c) trip means moveable wherein the plunger means can dislodge the trip means from the holding means and release the trapping means when the coil means is powered by the electrical circuit; and
  (d) electrical switch means mounted on the one side of the base which is engaged by the animal to activate the electrical circuit, electromechanical means and trip means.

* * * * *